United States Patent
Painton

[15] 3,664,244
[45] May 23, 1972

[54] INDICATING APPARATUS FOR EXPOSURE CONTROL APPARATUS

[72] Inventor: Richard C. Painton, West Webster, N.Y.

[73] Assignee: Eastman Kodak Company, Rochester, N.Y.

[22] Filed: Sept. 10, 1970

[21] Appl. No.: 70,981

[52] U.S. Cl. ........................95/10 CD, 95/64 D, 352/141
[51] Int. Cl. ................................G01j 1/44, G03b 7/08
[58] Field of Search ............95/10 C, 10 CE, 10 CT, 10 CD, 95/53 E, 53 EB, 64 D; 352/141

[56] References Cited

UNITED STATES PATENTS

| | | | |
|---|---|---|---|
| 3,397,629 | 8/1968 | Mori et al. | 95/10 CT |
| 3,452,656 | 7/1969 | Ruhle et al. | 95/10 C |
| 3,518,927 | 7/1970 | Mehlitz et al. | 95/10 CE |
| 3,527,149 | 9/1970 | Starp et al. | 95/10 CT |

FOREIGN PATENTS OR APPLICATIONS

| | | | |
|---|---|---|---|
| 1,043,474 | 9/1966 | Great Britain | 95/10 CT |
| 1,093,731 | 12/1967 | Great Britain | 95/10 CT |

*Primary Examiner*—Joseph F. Peters, Jr.
*Attorney*—Robert W. Hampton and Raymond L. Owens

[57] ABSTRACT

Indicating apparatus for use in a camera having a battery and automatic exposure control apparatus is disclosed. The indicating apparatus includes an amplifier and a manually operative switch member which in a first position couples the exposure control apparatus to the amplifier such that the amplifier will energize a low light indicating lamp only when the scene brightness is unsuitable for film exposure. The switch is movable to a second position to connect the first amplifier to a battery by way of a voltage divider network such that the first amplifier will energize the lamp only if a potential of the battery is above a predetermined level.

8 Claims, 2 Drawing Figures

Patented May 23, 1972

3,664,244

RICHARD C. PAINTON
INVENTOR.

BY Raymond Owens
Robert W. Hampton

ATTORNEYS

INDICATING APPARATUS FOR EXPOSURE CONTROL APPARATUS

CROSS-REFERENCES TO RELATED APPLICATIONS

Reference is made to commonly assigned copending U.S. patent application Ser. No. 84,389, entitled "Self-Balancing Apparatus for Photographic Cameras," filed Oct. 27, 1970 in the name of David L. Babcock and David B. Lederer.

BACKGROUND OF THE INVENTION

The present invention relates to apparatus for indicating if scene brightness is suitable to expose film.

In battery-powered motion picture cameras which also employ circuitry for indicating if the scene brightness is suitable for film exposure, it is desirable to provide a camera user with convenient means to determine whether the battery potential is sufficient so that an operator will not waste film by operating the camera when the battery potential has decayed below that potential level necessary for proper operation.

There are prior arrangements employing circuitry for determining if scene brightness is suitable and for testing the battery potential level. These arrangements are often complex. Moreover, separate and distinct battery testing arrangements have been used which employ variable deflections of an instrument pointer, which requires operator judgement to determine whether the battery potential is suitable for proper use.

SUMMARY OF THE INVENTION

In accordance with a preferred embodiment of the invention, there is provided an indicating apparatus which is coupled to an exposure control apparatus having circuitry which develops a signal, when the scene brightness is unsuitable for film exposure. The indicating apparatus includes a first amplifier which is effective in a first condition to energize a low light indicating lamp and in a second condition to de-energize the lamp; a second amplifier which when coupled to the first amplifier is responsive to the signal to drive the first amplifier into the first condition to energize the lamp indicating an unsuitable scene illumination; a voltage dividing resistance network adapted to be coupled to the first amplifier and responsive to a potential of the battery being above a predetermined level to cause the first amplifier to energize the lamp; and a switch member movable between a first position for coupling the first and second amplifiers and in a second position for coupling the voltage dividing network to the first amplifier.

BRIEF DESCRIPTION OF THE DRAWING

The above and other objects and advantages of the present invention will become apparent from the following detailed description taken in conjunction with the attached drawings wherein.

DESCRIPTION OF THE PREFERRED EMBODIMENT

Exposure control apparatus embodying the invention may be employed in cameras of either the still or motion picture variety. Since such cameras are well known, the present description will be directed in particular to elements forming part of, or cooperating more directly with apparatus in accordance with the present invention. It will be understood that parts not specifically shown or described are selectable from those known in the art.

Figure 1:
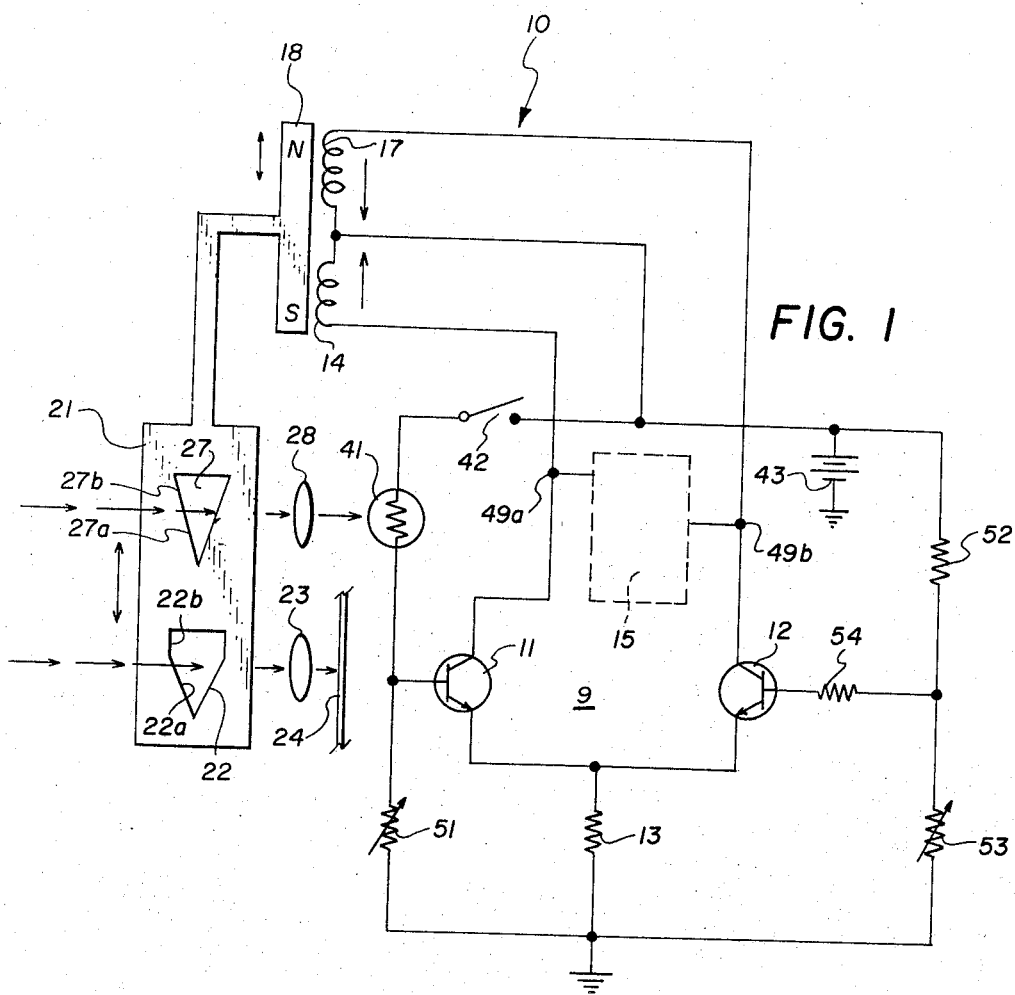
FIG. 1 is a schematic representation showing the general arrangement of an automatic exposure apparatus, as contemplated by a specific illustrative embodiment of the invention.

Turning now to FIG. 1, there is shown an exposure control apparatus 10 which includes a self-balancing control circuit 9 having a differential amplifier configuration and indicating apparatus 15 shown fully in FIG. 2 and described later in this specification. The circuit 9 is magnetically coupled to a core member 18 by means of a "close" winding 14 and an "open" winding 17. The magnetic core member 18 is moved in a downward direction when open winding 17 is energized, as subsequently described, and is moved in an upward direction when close winding 14 is energized. The core member 18 is mechanically coupled to a diaphragm 21 which as shown may take the form of an elongated plate whereby the diaphragm 21 is moved by the magnetic core member 18 in a direction, and to an extent, directly related to the movement of the core 18.

The diaphragm 21 is provided with an aperture 22 through which scene light passes to a camera or objective lens 23 to a film 24, and an aperture 27 through which scene light passes by way of a lens 28 to a photosensitive device 41. The photosensitive device 41, such as a photoresistance element selected from a class in which a parameter, such as a resistance varies inversely with the intensity level of illumination instant thereon. The aperture 27 has a generally triangular configuration and will be assumed for the purpose of describing the operation of the system to have a lower tapered portion 27a and an upper tapered portion 27b. The aperture 22 associated with objective lens 23 has a triangular or tapered lower portion 22a and a rectangular upper portion 22b.

The exposure control apparatus 10 is adapted to move the diaphragm 21 back and forth in accordance with variations in scene brightness to maintain a selected level of illumination of the photocell. Considering specifically the relative shapes of the apertures 22 and 27, the rectangular portion 22b of the aperture 22 has a width corresponding to the maximum light transmitting capability of lens 23. The diaphragm 21 is movable through a first range of positions wherein the lower portion 27a of aperture 27 and the lower triangular shaped portion 22a of apertures 22 will be positioned relative to the optical axes of lenses 28 and 23, respectively, to vary the effective sizes of the apertures relative to both lenses. The diaphragm 21 is movable through a second predetermined range of movement wherein the upper tapered portion 27b of the aperture 27 and the upper rectangular portion 22b of aperture 22 will be disposed in cooperative relation with the lenses 23 and 28, respectively.

In operation, as the intensity of the scene brightness diminishes the diaphragm 22 moves downward and the light transmitted to each of the lenses 23 and 28 will be gradually increased if the diaphragm is in its first range of movement. As the diaphragm 22 moves in its second range of movement, the light transmitted to lens 23 will remain constant and correspond to the maximum light transmitting capability of the lens 23. As will be later described in more detail, the relative shapes of the apertures 22 and 27, which permits the diaphragm 21 to adjust the effective size of aperture 27 while maintaining the effective size of aperture 22 constant in its second range of movement, enables the control circuit to produce a null balance condition during low scene brightness conditions which are still sufficient for suitable film exposure to avoid unnecessary operation of a low light indicator lamp 47 hereinafter described.

The control circuitry for the apparatus 10 may take various forms known in the art. The circuit disclosed in commonly assigned U.S. Pat. No. 3,427,941 in the name of Lenard M. Metzger is especially suitable for use with the invention as is the circuit described in commonly assigned copending U.S. patent application Ser. No. 823,426 entitled ELECTROMAGNETIC AUTOMATIC APERTURE CONTROL UTILIZING A VELOCITY SENSING WINDING TO PROVIDE ACTIVE FEEDBACK VISCOUS DAMPING, in the name of Carter et al, now abandoned in favor of application Ser. No. 66,642, filed Aug. 25, 1970. To operate the circuit, a switch 42 is closed which connects a battery 43 into the control circuit 10. Two NPN transistors 11 and 12 are disposed in a differential amplifier configuration which have their emitter electrodes connected to ground through a common resistance 13. The "close" winding 14 is connected as a series element in the base collector circuit of the transistor 11, and the "open" winding 17 is similarly connected as a series element in the base collector circuit of the transistor 12. The windings 14 and 17 respectively are oppositely wound so that when energized, they will exert opposite forces on the magnetic core member 18 as indicated by the arrows in the drawing.

The differential amplifier is controlled by a resistance bridge having two arms defined by the photocell 41 and resistance element 51 respectively and the two arms defined by resistance elements 52 and 53, respectively. The bridge is balanced when illumination incident on the photocell 41 is such that the ratio or the resistance value of photosensitive device 41 to the resistance of element 51 is substantially equal to the ratio of the resistance values of the elements 52 and 53. In such condition, equal currents will pass through drive coils 14 and 17. Thus, there will be no net force tending to move the core member 18 which will be in an arrested condition. The system is calibrated such as by adjustment of the values of resistors 51 and 53 so that the bridge will be balanced when the amount of light transmitted to the lens 23 is of the desired magnitude for exposing the film 24. The selected resistance value of the photosensitive device 41 corresponds to a desired exposure setting.

If the ambient light drops below a previous level where the circuit 10 was balanced, the resistance of the photosensitive device 41 will increase thereby increasing the ratio of resistance values of elements 41 and 51 to a magnitude greater than that of elements 52 and 53 and cause the amplifier to supply additional energizing current to drive coil 17; this is effective, in turn, to cause movement of the diaphragm 21 in a "down" direction. The open winding 17 will be energized from a path leading from the battery 43, the winding 17, the collector-emitter path of transistor 12, and the resistor 13 to ground. This downward movement of diaphragm 21 is effective to "open" apertures 22 and 27, increasing the amount of light supplied to the photocell 41 and film 24 until a balanced condition is again reached.

Conversely, under conditions when the amount of light reaching photocell 41 and film 24 is greater than the previously established ideal magnitude for good quality pictures, the ratio of the resistance values of the elements 41 and 51 will then be less than the ratio of the resistance values of the elements 52 and 53 and the amplifier will then function to supply additional energizing current to drive coil 14 moving the diaphragm 21 in an upward direction. Movement in this direction will be effective to "close" apertures 22 and 27.

Assuming the diaphragm is in its second range of positions and the camera lens aperture 22 has increased to a maximum size and balancing has not yet been reached, the aperture 27 will further increase in size until balancing is reached or until the upper portion 27b of the aperture 27 is at a size wherein the maximum light transmitting capability of the lens 28 is reached. In the latter case, the aperture 27 can be considered to have reached a maximum size. With the maximum light transmitting capability of the lens 28 being reached, and with scene brightness further diminishing, the potential difference between a terminal 49a (at the electrical junction between the coil 14 and the collector of the transistor 11) and a terminal 49b (at the electrical junction between the coil 17 and the collector of the transistor 12) will increase until a level is reached whereby the indicating apparatus 15 is activated to provide a conductive path from the battery 43 to energize the low light lamp 47.

Figure 2:
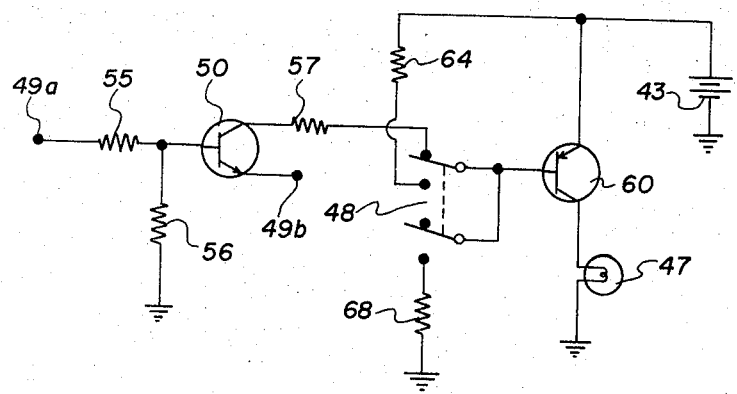
FIG. 2 is a schematic diagram of the indication apparatus represented by a block in FIG. 1.

Turning now to FIG. 2, the indicating apparatus 15 is shown coupled to the exposure control circuit terminals 49a and b and includes a manually operated switch 48, which in the first of two selectable positions, conditions the apparatus 15 to indicate whether the scene illumination is at a level which has been determined to be too low to permit suitable film exposure, and in the second position permits the apparatus 15 to determine whether the DC potential of the battery 43 is above a selected level.

The terminal 49a is connected to ground by way of a voltage dividing network comprised of resistors 55 and 56. In accordance with the invention there is provided a second amplifier stage which includes a transistor 50, having its base connected at the junctions of the resistors 55 and 56 and its emitter connected to the terminal 49b. The switch 48 is shown in its first position wherein it connects the collector of the transistor 50 through resistor 57 to the base electrode of a PNP transistor 60 which is disposed in a first amplifier stage. The transistor 60 has its collector electrode connected to ground through the low light indicator lamp and its emitter electrode connected to the battery 43.

During normal operation the voltage difference between the terminals 49a and b will be negligible and the transistor 50 will be in a cut-off condition. However, when the potential level at the terminal 49a becomes positive with respect to the terminal 49b and reaches a selected level determined by the voltage dividing resistive network 55 and 56, the transistor 50 will be driven from cut-off into an active mode of operation.

Returning momentarily to the time when the transistor 50 was nonconductive, there would be no substantial voltage difference between the collector base junction of the transistor 60, and the transistor 60 would also be in a cut-off mode of operation. However, when the transistor 50 conducts, the transistor 60 will be driven into the active region of operation and a substantial current will flow through the collector-emitter path of the transistor 60 which is sufficient to energize the lamp 47 signaling a warning of an unsuitable exposure condition.

To test the battery potential 43, the switch 48 is moved to its second position which open circuits the connection between the collector of the transistor 50 and the base of the transistor 60, and now disposes the base of the transistor 60 at the electrical junction of resistors 64 and 68 which comprise a voltage including network. The resistance elements 64 and 68 are serially connected to the battery 43 and are selected to have values such that the transistor 60 will conduct when the battery 43 has a selected potential level, which is considered necessary for suitable operation of the exposure control apparatus 10. With such a battery potential level, the transistor 60 will be turned on and driven into an active condition sufficient to energize the lamp 47.

Reviewing, the low light indicator lamp 47 is not energized immediately upon the maximum light transmitting capability of objective lens 23 being reached, but is energized only if the ambient light continues to decrease in intensity, and downward movement of diaphragm 11 continues until the scene brightness is at a level which has been determined to be unsuitable for film exposure.

The invention has been described in detail with particular reference to a preferred embodiment thereof, but it will be understood that variations and modifications can be effected within the spirit and scope of the invention.

I claim:

1. In exposure control apparatus adapted to receive a battery and having means for producing a signal when scene brightness is unsuitable to effect desired film exposure, indicating apparatus comprising:
   a. electrically operative indicating means;
   b. a first amplifier adapted to be coupled to the battery and said indicating means and being effective in a first condition for energizing said indicating means and in a second condition for de-energizing said indicating means;
   c. a second amplifier adapted to couple the signal producing means to said first amplifier and responsive to the signal to produce one of said conditions in said first amplifier to indicate an unsuitable scene brightness condition;
   d. battery testing means responsive to a potential of the battery above a predetermined level to produce one of said conditions in said first amplifier and responsive to a potential of the battery below the predetermined level to produce the other of said conditions in said first amplifier; and
   e. a switch member movable between a first position for coupling said first and second amplifiers and a second position for coupling said battery testing means to said first amplifier.

2. In exposure control apparatus adapted to receive a battery and having means for producing a signal when scene brightness is unsuitable to effect desired film exposure, indicating apparatus comprising:
   a. electrically operative indicating means;
   b. a first amplifier adapted to be coupled to the battery and said indicating means and being effective in a first condition for energizing said indicating means and in a second condition for de-energizing indicating means;
   c. a second amplifier adapted to couple the signal producing means to said first amplifier and produce said first condition in said first amplifier in response to the signal to indicate an unsuitable scene brightness condition;
   d. battery testing means adapted to produce said first condition in said first amplifier in response to a potential of the battery being above a predetermined level indicating a suitable potential source level and produce said second condition in said first amplifier in response to a potential of the battery being below the predetermined level; and
   e. a switch movable between a first position for coupling said first and second amplifiers and a second position for coupling said battery testing means to said first amplifier.

3. The invention as set forth in claim 2 wherein said indicating means comprises a lamp and wherein said first amplifier includes a first transistor which is in an active mode of operation in said first condition and a cut-off mode of operation in said second condition.

4. The invention as set forth in claim 3 wherein said second amplifier includes a second transistor adapted to be coupled to said first transistor and responsive to the signal to switch said first transistor to said active mode of operation and wherein said potential responsive means includes a voltage dividing network.

5. In exposure control apparatus adapted to receive a battery, the combination comprising:
   a. photosensitive means having an electrical parameter which varies as a function of incident illumination;
   b. exposure varying means coupled to said photosensitive means and having a film exposure aperture, said exposure varying means being movable to vary the effective size of said aperture with respect to said photosensitive means as a function of said parameter;
   c. means coupled to said photosensitive means and responsive to a predetermined value of said parameter to produce a signal indicating when scene brightness is unsuitable for film exposure;
   d. electrically operative indicating means;
   e. a first amplifier adapted to be coupled to the battery and said indicating means and being effective in a first condition for energizing said indicating means and in a second condition for de-energizing said indicating means;
   f. a second amplifier adapted to couple said signal producing means to said first amplifier and responsive to the signal to produce one of said conditions in said first amplifier to indicate an unsuitable scene brightness condition;
   g. battery testing means adapted to produce said first condition in said first amplifier in response to a potential of the battery being above a predetermined potential level indicating a suitable battery potential level and produce said second condition in said first amplifier in response to a potential of the battery being below the predetermined level; and
   h. a manually operative member selectively movable between a first position for coupling said first and second amplifiers and a second position for coupling said battery testing means to said first amplifier.

6. The invention as set forth in claim 5 wherein said indicating means comprises a lamp and wherein said first amplifier includes a first transistor which is in an active mode of operation in said first condition and a cut-off mode of operation in said second condition.

7. The invention as set forth in claim 6 wherein said second amplifier includes a second transistor adapted to be coupled to said first transistor and responsive to the signal to switch said first transistor to said active mode of operation and wherein said battery testing means includes a voltage dividing network.

8. In exposure control apparatus adapted to receive a battery, the combination comprising:
   a. photosensitive means having an electrical parameter which varies as a function of incident illumination;
   b. exposure varying means coupled to said photosensitive means and defining a film exposure aperture, said exposure varying means being movable to vary the effective size of said aperture with respect to said photosensitive means as a function of said parameter;
   c. means coupled to said photosensitive means and adapted to produce a first signal when scene brightness is unsuitable for film exposure and a second signal when scene brightness is suitable for film exposure;
   d. an electrically operative lamp;
   e. a first amplifier adapted to be coupled to the battery and said lamp and effective in a first condition for energizing said lamp and in a second condition for de-energizing said lamp;
   f. a second amplifier adapted to couple said signal producing means to said first amplifier and responsive to said first signal to produce said first condition in said amplifier energizing said lamp to indicate an unsuitable scene brightness condition and responsive to said second signal to produce said second condition in said first amplifier de-energizing said lamp indicating a suitable scene brightness;
   g. battery tester means adapted to couple the battery to said first amplifier and produce said first condition in said first amplifier in response to a potential of the battery being above a predetermined potential level energizing said lamp indicating a suitable battery potential level and produce said second condition in said first amplifier in response to a potential of the battery being below the predetermined level; and
   h. a manually operative switch member movable between a first position for coupling said first and second amplifiers and a second position for coupling said battery testing means to said first amplifier.

* * * * *